United States Patent
Jinbo et al.

(10) Patent No.: US 6,618,554 B1
(45) Date of Patent: *Sep. 9, 2003

(54) CONTROLLING THE ACCELERATION AND DECELERATION OF A MOTOR WITH AN ACCELERATION EASEMENT INTERVAL

(75) Inventors: Noriyuki Jinbo, Toyohashi (JP); Akira Takasu, Toyokawa (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/939,685

(22) Filed: Sep. 29, 1997

(30) Foreign Application Priority Data

Sep. 30, 1996 (JP) .................................................. 8-259744

(51) Int. Cl.⁷ ................................................. H02P 1/04
(52) U.S. Cl. ................................................... 388/849
(58) Field of Search .............................. 318/696, 685, 318/60, 61, 63, 64, 274, 276; 388/843, 849, 904

(56) References Cited

U.S. PATENT DOCUMENTS

| | | | | |
|---|---|---|---|---|
| 3,828,236 A | * | 8/1974 | Close | 318/696 |
| 3,893,616 A | * | 7/1975 | Trousdale | 318/561 |
| 4,254,371 A | * | 3/1981 | Scholten | 318/685 |
| 4,287,461 A | * | 9/1981 | Promis et al. | 318/571 |
| 4,353,020 A | * | 10/1982 | Veale | 318/601 |
| 4,586,808 A | | 5/1986 | Tanimoto et al. | |
| 4,591,774 A | * | 5/1986 | Ferris et al. | 318/696 |
| 4,847,544 A | * | 7/1989 | Goldberg | 318/696 |

* cited by examiner

Primary Examiner—Jonathan Salata
(74) Attorney, Agent, or Firm—McDermott, Will & Emery

(57) ABSTRACT

An optical system driving device is provided. This optical system driving device includes a driving unit for driving an optical system, and a controller for controlling the driving unit so as to create an easement interval for temporarily easing the acceleration during an acceleration period. The optical system reaches a predetermined running velocity at the end of the acceleration period.

12 Claims, 13 Drawing Sheets

2-PHASE EXCITATION SYSTEM

1-2 PHASE EXCITATION SYSTEM

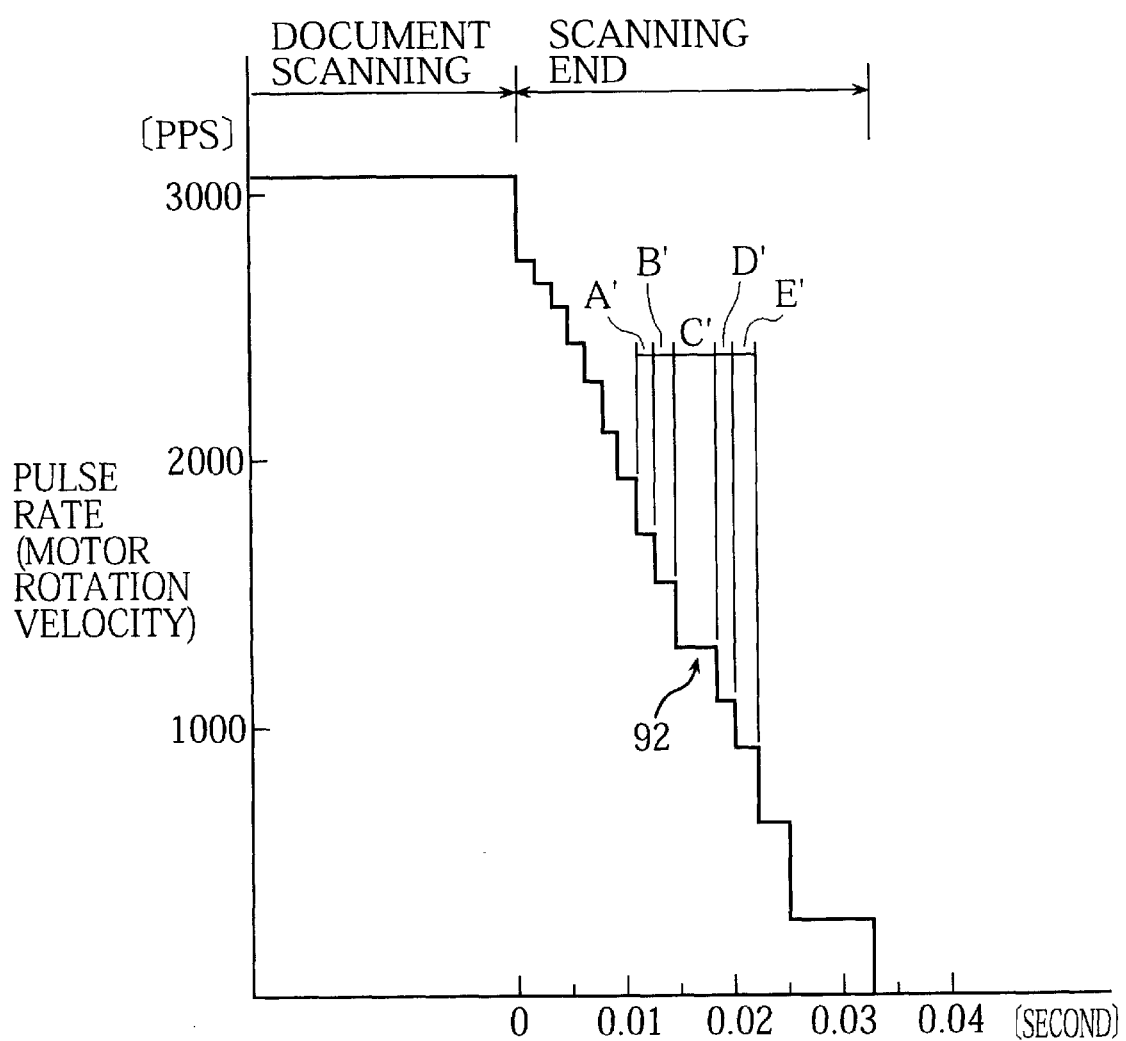

FIG. 12

Table 1

| INTERVAL | PULSE RATE [PPS] | PULSE NUMBER [N] | TIME (N/PPS) [SECOND] |
|---|---|---|---|
| A | 2260 | 3 | 0.00133 |
| B | 2325 | 3 | 0.00129 |
| C | 2390 | 10 | 0.00418 |
| D | 2450 | 3 | 0.00122 |
| E | 2505 | 3 | 0.00120 |

FIG. 13

Table 2

| INTERVAL | PULSE RATE (PPS) | PULSE NUMBER (N) | TIME(N/PPS) (SECOND) |
|---|---|---|---|
| A' | 1740 | 3 | 0.00172 |
| B' | 1525 | 3 | 0.00197 |
| C' | 1300 | 5 | 0.00385 |
| D' | 1120 | 2 | 0.00179 |
| E' | 920 | 2 | 0.00217 |

CONTROLLING THE ACCELERATION AND DECELERATION OF A MOTOR WITH AN ACCELERATION EASEMENT INTERVAL

BACKGROUND OF THE INVENTION (1) Field of the Invention

The present invention relates to a driving device for an optical system, such as a scanner, and more particularly to a driving device for an optical system used for the document reading unit of a copying machine.

(2) Related Art

In a copying machine of stationary document scanning type, a document is placed on a platen glass, and an optical system provided below the platen glass is driven in parallel with the surface of the document by a predetermined driving device to optically read the image of the document.

When scanning a document, inconsistencies in the velocity of the scanner (scanning velocity) or in the timing at which scanning is commenced can lead to inconsistencies in the reproduction image, resulting in low image quality. For this reason, a pulse motor is employed as a driving source for the scanner driving device, and the generation of driving pulses for this pulse motor is controlled to obtain a stable scanning velocity and read starting position.

In this kind of conventional driving device, however, when the pulse motor is activated, the pulse motor is controlled to accelerate with constant acceleration until the scanner reaches a predetermined velocity (scanning velocity), at which point there have been problems regarding fluctuations in the velocity of the scanner. As shown in FIG. 1A, when the pulse motor accelerates from start with constant acceleration as shown by the solid line Q, the actual velocity at which the scanner is moving traces the curved line P drawn as a broken line. When the pulse motor reaches a predetermined velocity Vc, the scanner overshoots this velocity and thereafter moves with a fluctuating velocity. This overshoot is caused by a sudden release of tension that has built-up in the materials, such as wires, timing belt, and tension spring, forming the power transmission mechanism between the pulse motor and the scanner, with it being very difficult to eliminate the elasticity of these materials. The fluctuations in velocity caused by the overshoot adversely affect the image reading accuracy, resulting in a blurred reproduction image.

To avoid such problems, U.S. Pat. No. 4,586,808 discloses a method for preventing occurrences of overshoot and fluctuations in velocity by providing a deceleration region before the scanner reaches the predetermined velocity, as shown by a solid line R in FIG. 1B.

According to the prior art, fluctuations in velocity of the scanner can be prevented when the predetermined velocity is reached, although when a deceleration region is provided before the predetermined velocity is reached, a force due to the inertia of the moving scanner is transmitted from the scanner to the pulse motor via the power transmission mechanism. To endure the force due to the inertia of the scanner, the pulse motor needs to be large, or in other words have high torque, which increases the space required by the motor and leads to increases in the cost of the equipment.

SUMMARY OF THE INVENTION

The first object of the present invention is to provide a driving device for an optical system that can effectively prevent fluctuations in the velocity of the optical system without using a large-sized motor.

The second object of the present invention is to provide a method for driving a driving device that can effectively prevent fluctuations in the velocity of the optical system without using a large-sized motor.

The first object of the present invention can be achieved by providing an optical system driving device comprising a driving unit for driving an optical system, and a controller for controlling the driving unit to create an easement interval for temporarily easing acceleration during an acceleration period in which the optical system accelerates to reach a predetermined velocity. The first object of the present invention can be achieved by providing a driving device comprising a driving unit for driving a driven object, and a controller for controlling the driving unit to create an easement interval for temporarily easing acceleration during an acceleration period in which the driven object is driven at a constant acceleration rate or an increasing acceleration rate.

The second object of the present invention is to provide a method for operating a driving device, comprising the steps of: performing an acceleration operation to move a driving unit in a predetermined direction; performing an easement operation to ease acceleration; and terminating the easement operation to resume the acceleration operation.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 10 shows an example rotational operation of the pulse motor when scanning is commenced.

FIG. 12 shows, in Table 1, pulse rate, the number of pulses and the interval time in intervals A through E.

FIG. 13 shows, in Table 2, pulse rate, the number of pulses and the interval time in intervals A' through E'.

DESCRIPTION OF THE PREFERRED EMBODIMENTS

The following is a description of the embodiments of the optical system driving device of the present invention applied to an analog copying machine.

(1) Overall Structure of the Analog Copying Machine

Figure 1A:
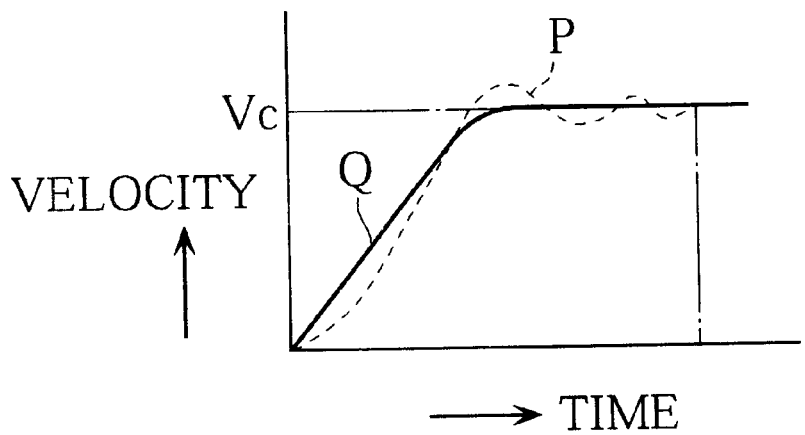
FIG. 1A shows the relationship between the rotational operation of the pulse motor and the velocity of the optical system in the prior art.
Figure 1B:
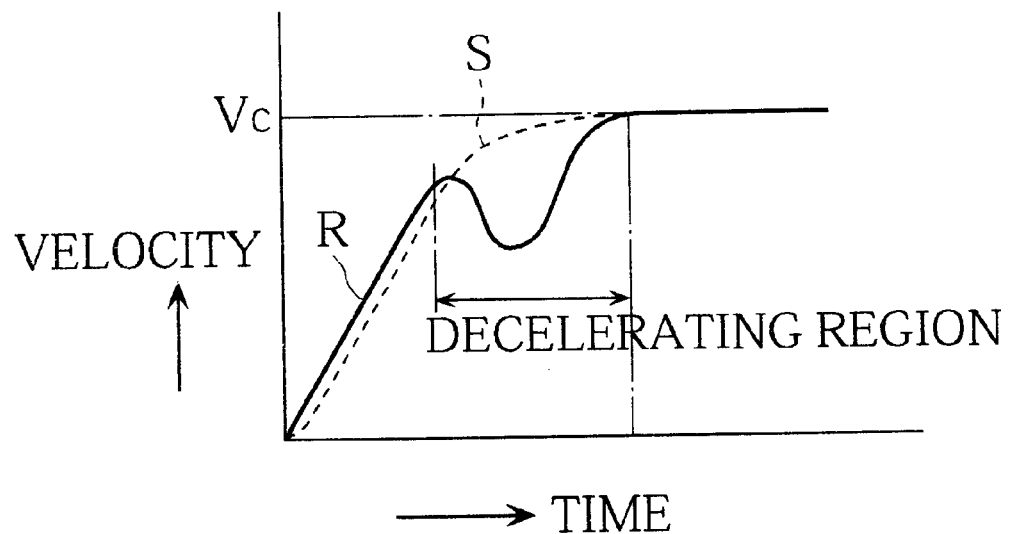
FIG. 1B shows the relationship between the rotational operation of the pulse motor and the velocity of the optical system in the prior art.
Figure 2:
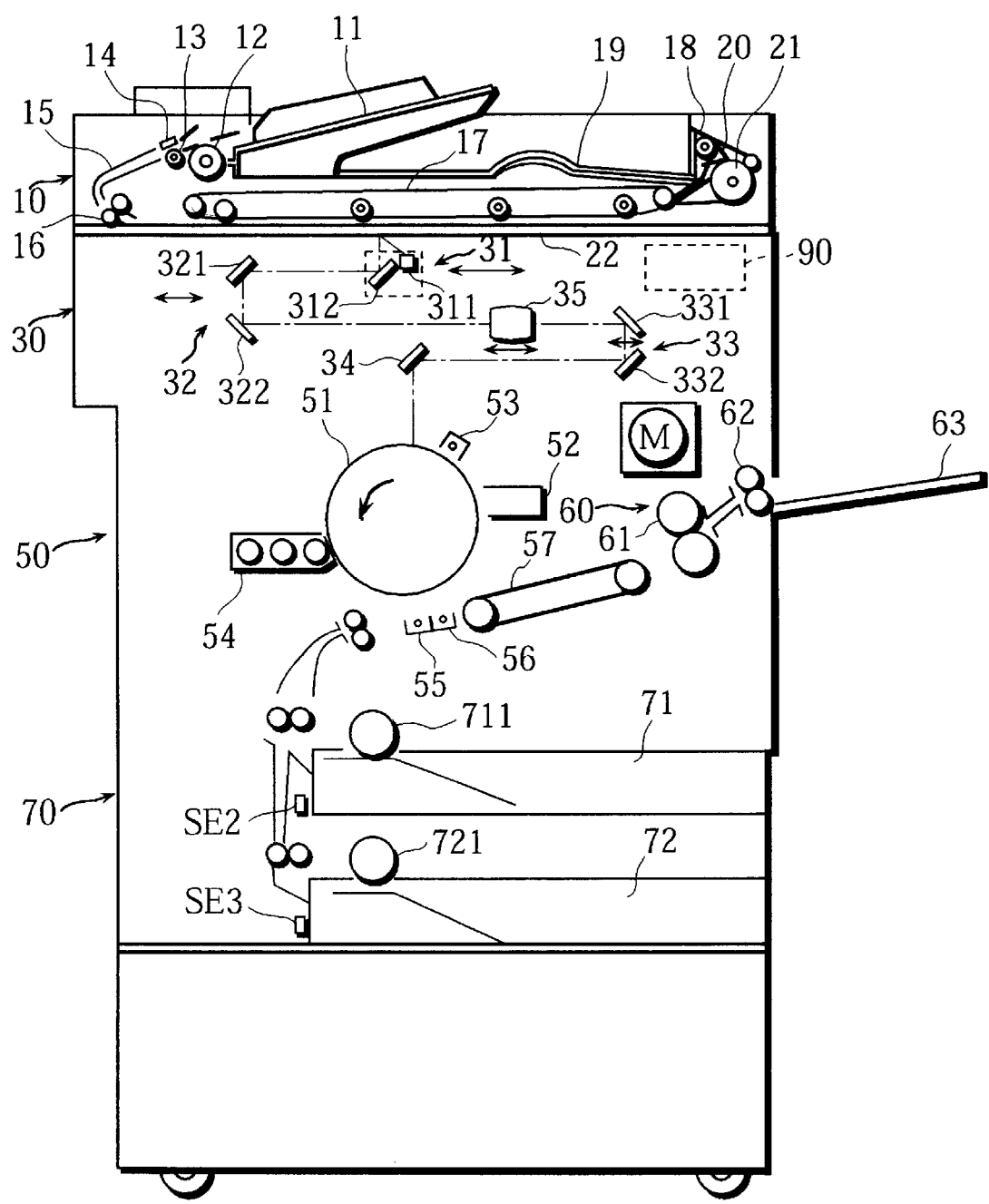
FIG. 2 shows the overall structure of an analog copying machine provided with the optical system driving device of the present invention.

FIG. 2 shows the overall structure of the analog copying machine (hereinafter, this copying machine will be referred to simply as "the copying machine"). As shown in the figure, the copying machine consists of an automatic document transport device 10, a document reading unit 30, a printer unit 50, and a sheet feeding unit 70.

The automatic document transport device 10 automatically sends documents to the document reading unit 30 one by one. The documents placed on the document feed tray 11 are separated from each other by the feeding roller 12, the separating roller 13, and the separating pad 14. Each of the separated documents is then sent downwards along the guide 15 and is transported by the resist rollers 16 and the transportation belt 17 to a predetermined document reading position on the platen glass 22.

The document reading unit 30 reads an image from the document transported to the document reading position. The document is then transported by the transport belt 17 counterclockwise in the figure, and discharged onto the document receiving tray 19 via the discharging roller 18.

When reading the back side of the document, a switching claw 20 switches the document transport path towards a reverse roller 21. The reverse roller 21 then turns the document over and sends back to the platen glass 22. The document is then transported to the document reading position on the platen glass 22 by the transport belt 17.

After the back side of the document has been read by the document reading unit 30, the document is then transported counterclockwise by means of the transport belt 17, and discharged onto the document receiving tray 19 as described above. At the same time, the next document placed on the document feed tray 11 is transported to the document reading position.

The document reading unit 30 is provided with a first slider unit 31 (a scanner) which is driven by a pulse motor 36 (see FIG. 3) so that it moves in the directions shown by the arrows in the figure. The first slider unit 31 includes an exposure lamp 311 and a first mirror 312 which reflects the reflected light from the document irradiated by the exposure lamp 311 in parallel with the platen glass 22. The reflected light is reflected into a magnification changing lens 35 via second and third mirrors 321 and 322, and then scans the surface of a photosensitive drum 51 via fourth, fifth, and sixth mirrors.

Prior to exposure, a cleaning unit 52 removes residual toner from the surface of the photosensitive drum 51. An eraser lamp (not shown) irradiates the toner-removed surface of the photosensitive drum 51 to neutralize it. After that, the toner-removed surface of the photosensitive drum 51 is uniformly sensitized by a sensitizing charger 53. An electrostatic latent image is then formed on the uniformly sensitized surface of the photosensitive drum 51.

The developing unit 54 contains developer consisting of black toner and carrier. It supplies the toner to develop the electrostatic latent image formed on the surface of the photosensitive drum 51 and so form a toner image.

The sheet feeding unit 70 is provided with two sheet cassettes 71 and 72. The size of a copying sheet in the cassettes is detected by optical sheet size detecting sensors SE1 and SE2.

The photosensitive drum 51 is exposed in synchronization with the developing operation. A copying sheet of a desired size is fed from one of the sheet cassettes 71 and 72 by driving a corresponding sheet feeding roller 711 or 712. The copying sheet comes into contact with the surface of the photosensitive drum 51 on the bottom side. The toner image formed on the surface of the photosensitive drum 51 is then transferred onto the surface of the copying sheet by means of the electrostatic force of the transfer charger 55.

After that, the copying sheet is separated from the surface of the photosensitive drum 51 by a separating charger 56 and is then transported to the fixing unit 60 by means of the transport belt 57.

In this state, the toner particles on the surface of the copying sheet are in an impermanent state, and so are pressed and heated at the same time by fixing rollers 61 which have a heater inside. In this way, the toner particles can be fused and fixed to the copying sheet. The copying sheet with the fixed toner image is then discharged onto a sheet receiving tray 63.

An operation panel 90 (shown by the broken line in FIG. 2) is provided in a fore-side position where users can easily operate it. This operation panel 90 includes a copy start key, a ten-key pad for setting the number of copies, various input keys, and a display unit for displaying the settings made using the keys.

Figure 3:
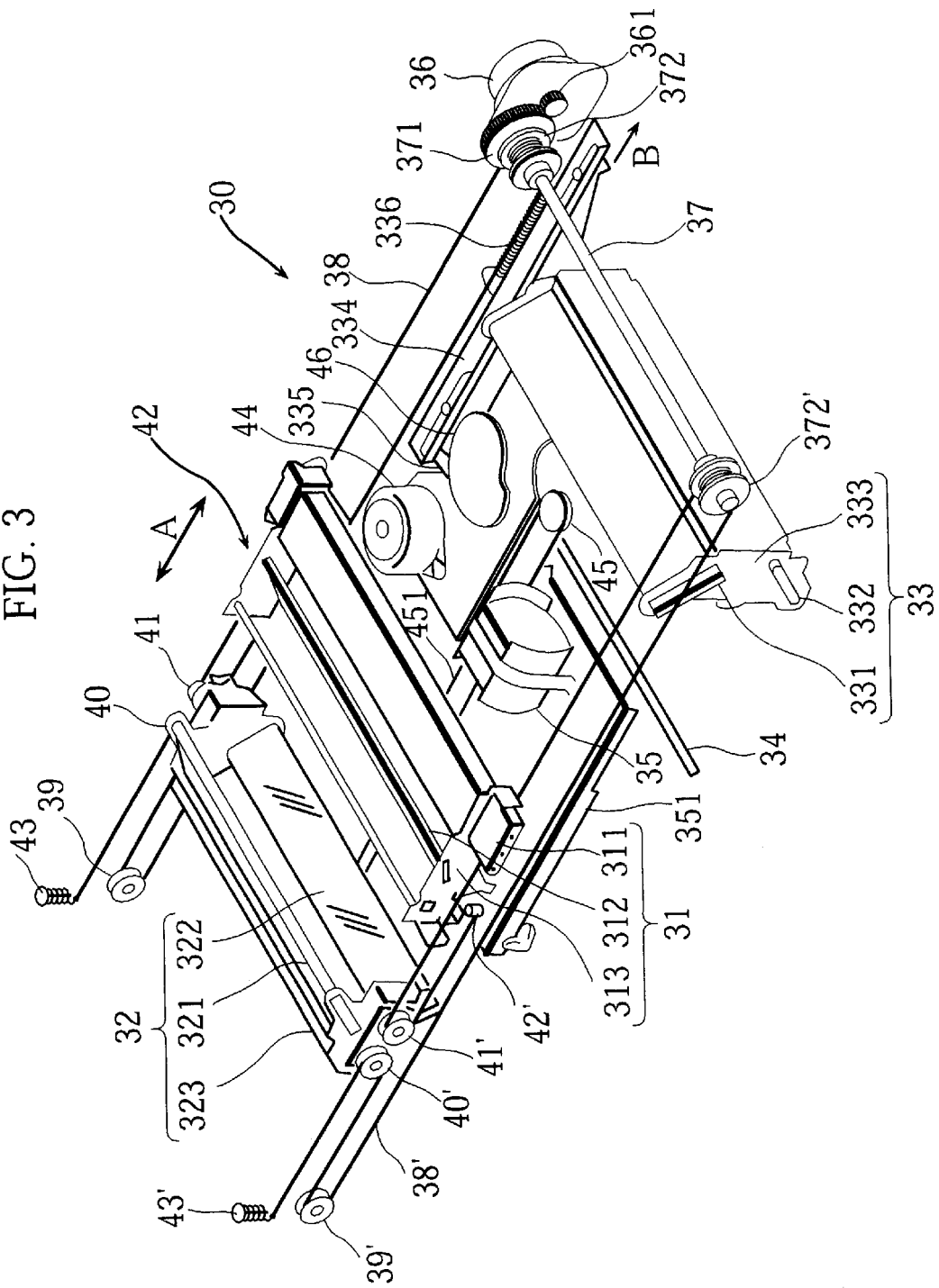
FIG. 3 shows the structure of the drive mechanism of the document reading unit of the copying machine.

FIG. 3 is a perspective view of the structure of the driving part of the document reading unit 30. This document reading unit 30 comprises the first slider unit 31, a second slider unit 32, and a third slider unit 33. Each slider unit is held at both ends, and kept slidable by a rail (not shown) provided in the sub-scanning direction (shown by arrow A).

The first slider unit 31 serves as a scanner as described above, and comprises the exposure lamp 311, the first mirror 312, and a first slider 313 for holding the exposure lamp 311 and the first mirror 312. The second slider unit 32 comprises a second mirror 321, a third mirror 313, and a second slider 323 for holding these mirrors so that the two mirror surfaces make a right angle with each other. Likewise, the third slider unit 33 comprises a fourth mirror 331, a fifth mirror 332, and a third slider 333 for holding these mirrors so that the two mirror surfaces make a right angle with each other. The positions of the mirrors 312, 321, 322, 331, 332 are as shown in FIG. 2. The above mirrors and a sixth mirror 34 are provided so that the light from the exposure lamp 311 which has been reflected back from the document surface will be directed to the surface of the photosensitive drum 51.

The following is an explanation of the drive mechanism for reciprocating the first slider unit 31 and the second slider unit 32.

The pulse motor 36 is used as the driving power, and rotates a shaft 37 held rotatable by a bearing unit (not shown) via a pinion 361 and a spur gear 371. At both ends of the shaft 37, pulleys 372 and 372' are coaxially fixed and rotate with the shaft 37. Pulleys 39 and 39' are provided on the other side of the device away from the pulleys 372 and 372' in the sub-scanning direction. Wires 38 and 38' are provided between the pulleys 372 and 372' and the pulleys 39 and 39', respectively. The wires 38 and 38' hold the first slider unit 31 at both ends.

Meanwhile, two pairs of pulleys 40 and 41, and 40' and 41' are set on shafts at both ends on the second slider 313, and the wires 38 and 38' are wound around the pulleys 40, 41, 40', and 41', as shown in FIG. 3.

One end of each of the wires 38 and 38' is attached to the document reading unit 30 by means of the fixed pins 42 and 42', while the other end is fixed to an end of each of torsion coil springs 43 and 43' to apply a tensile force to the wires 38 and 38'.

In this structure, the pulse motor 36 rotates to move the wires 38 and 38' via the pulleys 372 and 372', which in turn move the first slider unit 31 and the second slider unit 32. Here, the pulleys 40, 41, 40', and 41' serve as running blocks, so that the second slider unit 32 moves in the same direction as the first slider unit 31 at half the velocity of the first slider unit 31.

As a result, when the first slider unit 31 moves to scan a document, the optical path from the first mirror 312 to the magnification changing lens 35 can be kept at the same length, and the image forming position of the magnification changing lens 35 can be maintained on the surface of the photosensitive drum 51.

After the document scanning by the first slider unit 31, the pulse motor 36 rotates backward to return the first slider unit 31 to the home position. Here, the second slider unit 32 follows the first slider unit 31 to return its home position.

The reference numeral "44" in FIG. 3 indicates a drive motor 44 which moves the magnification changing lens 35 and the third slider unit 33 to change the magnification. The rotation of the drive motor 44 is transmitted to a pulley 45 and a magnification changing cam 46 to rotate both of them at a predetermined rotational velocity.

A wire 451 is wound around the pulley 45 and another pulley (not shown) provided in the sub-scanning direction. A lens mounting stand 351 to which the magnification changing lens 35 is mounted is attached midway on the wire 451. This lens mounting stand 351 is slidable in the sub-scanning direction using a sliding mechanism (not shown), and moves together with the wire 451 when the pulley 45 rotates. Thus, the optical path length between the first mirror 312 (the document surface to be more exact) and the magnification changing lens 35 can be changed to change the magnification of the reproduction image.

An arm member 334 which extends in the sub-scanning direction is provided on the inner side of the third slider 333. A contact member 335 in contact with the outer periphery surface of the magnification changing cam 46 is fixed to the tip of the arm member 334. Since an extension spring 336 energizes the arm member in the direction shown by the arrow B, the contact member 335 is always in contact with the outer periphery of the magnification changing cam 46, with the arm member 334 and the third slider 333 moving a predetermined amount with the rotation with the magnification changing cam 46.

By doing so, the third slider unit 33 moves by a necessary amount in synchronization with the magnification changing lens 35. Thus, the optical path length from the magnification changing lens 35 to the photosensitive drum 51 can be properly adjusted, and an image can be formed on the surface of the photosensitive drum 51, with changes in the magnification being easily accomplished.

(2) Structure of the Control Unit 100

Figure 4:
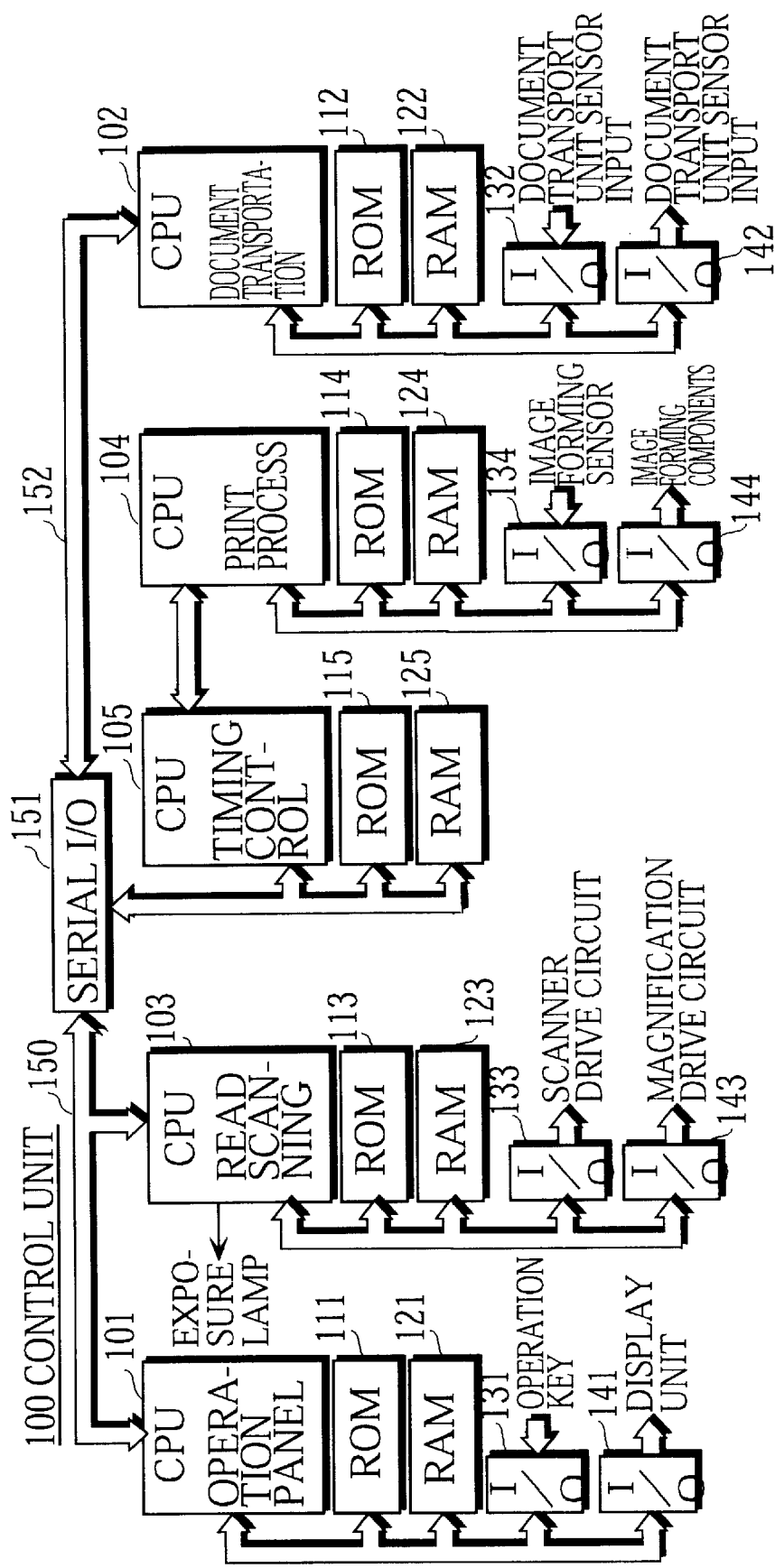
FIG. 4 is a block diagram of the control unit provided in the copying machine.

The following is an explanation of the structure of the control unit 100 provided inside the copying machine described above, with reference to the block diagram of FIG. 4.

The control unit 100 is structured around five CPUs 101 to 105, which are respectively provided with ROMs 111 to 115 for storing programs necessary for control operations, and RAMs 121 to 125 used as work areas when executing the programs.

The CPUs 101 to 105 are connected to each other via data buses 150 and 152, and a serial I/O port 151, so that they can send and receive data and commands among each other by means of interrupt control. When the copying machine is switched on, each of the CPUs 101 to 105 reads the initialization program stored in the corresponding ROM to perform initialization for the internal registers and RAMs. The measurement of time by an internal timer is also commenced, with the CPUs observing the execution of each routine so that they are performed within a predetermined time.

The following description concerns the structure and operation of each part of the control unit 100, starting from the reception of a key input made by the user operating the operation panel 90, and ending in the printing of the processed image data which has been read from a document.

The CPU 101 transmits the instruction content from the operation panel 90 to each CPU, and controls the display content of the operation panel 90. Based on the control program stored in the ROM 111, the CPU 101 transmits a signal inputted from each operation key on the operation panel 90 to each corresponding CPU via an I/O port 131. Based on the information received from other CPUs via an I/O port 141, the CPU 101 controls the display content of the display unit on the operation panel 90.

After receiving a copy start instruction from the operation panel 90, the CPU 102 controls the operation of the automatic document transport unit 10 to transport a document to the document reading position on the platen glass 22. In accordance with the control program stored in the ROM 112, upon receipt of a copy start instruction from the operation panel 90, the CPU 102 checks whether there is a document on the document feed tray 11 using a photoelectric sensor (not shown in the figure). If there is a document, the CPU 102 controls each roller of the automatic document transport unit 10 and the transport belt 17 to transport the document to the document reading position on the platen glass 22.

The CPU 102 then notifies the CPU 105 that the document has reached the document reading position, and in response to this notification, the CPU 105 transmits a scanning request to the CPU 103 with the appropriate timing.

Upon receipt of the scanning request, the CPU 103 controls the document scanning of the document reading unit 30. More specifically, the CPU 103 reads out the program necessary for the above control operation, and generates various control signals in accordance with the control program with the appropriate timing. The CPU 103 then switches the exposure lamp on, generates a control signal to a scanner drive circuit 200 (mentioned below) via an I/O port 133, controls the rotation of the pulse motor 36, and has the first slider unit 31 moved at the predetermined scanning velocity to scan the document. After the document scanning, the CPU 103 immediately returns the first slider unit 31 to the scanning start position.

If the user has designated the magnification in advance, the CPU 103 sends a control signal to a magnification drive circuit via an I/O port 143 prior to the document scanning. By doing so, the CPU 103 drives the driving motor 44, and moves the magnification changing lens 35 and the third slider unit 33 to achieve a desired magnification.

The document image obtained by the above scanning operation is formed as an electrostatic latent image on the surface of the photosensitive drum 51 which rotates at a predetermined rotational velocity. The image is then formed on a copying sheet using an electrophotography technique performed under print control of the CPU 104.

A program for the print control is stored in the ROM 114. The CPU 104 reads out the program to control the rotation of a main motor M via an I/O port 114 and the switching operation of a clutch mechanism (not shown in the figure) which transmits the rotation of the main motor M to the rotational shafts of the photosensitive drum 51 and the transportation belt 57. Thus, printing is performed on a copying sheet.

The CPU 104 receives detection signals from the sensors of the image forming system via an I/O port 104. In accordance with the detection signals from a temperature sensor, a humidity sensor, and a density detection sensor for detecting the amount of toner adhering onto the photosensitive drum 51 (these sensors are not shown in the figure), the CPU 104 controls the output of the sensitizing charger 53 and the transfer charger 55 to obtain an optimal reproduction image. In accordance with size detection signals from the sheet size detection sensors SE1 and SE2, the CPU 104 controls the feed operation by selecting one of the sheet cassettes 71 and 72, or detects a paper jam from a detection signal transmitted from a paper jam detection sensor and instructs the operation panel 90 via the CPU 101 to display that the paper jam has occurred.

All the control operations of the CPU 101 to 104 are timely controlled by the CPU 105, which reads out the necessary control program from the ROM 115, and controls the timing by the internal timer so that the overall process routine can be collectively executed and the above copying operation can be performed smoothly.

(3) Structure of Scanner Drive Circuit 200

Figure 5:
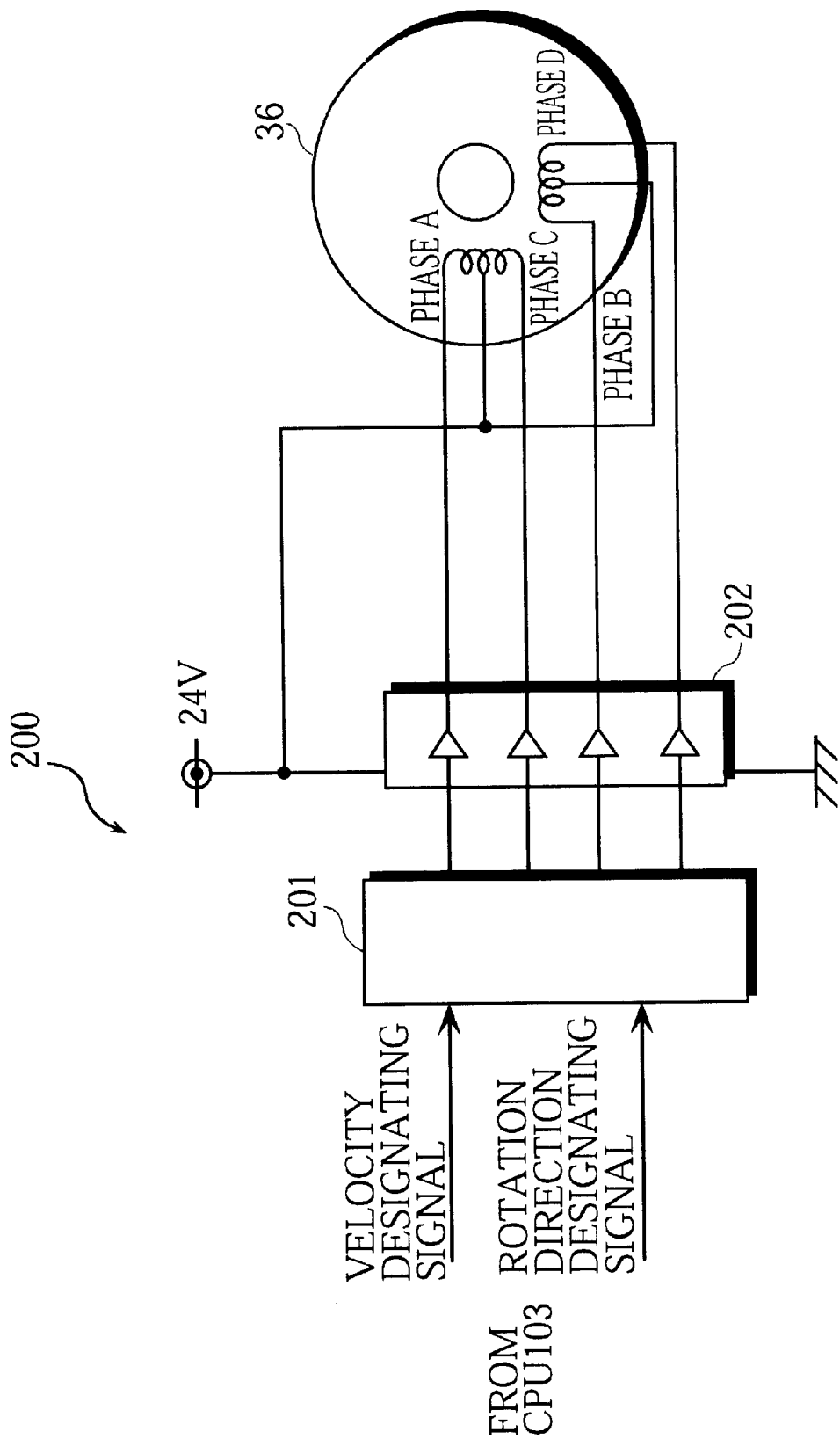
FIG. 5 is a block diagram of the scanner driving circuit in the control unit.

FIG. 5 is a block diagram showing a scanner drive circuit 200 which drives and controls the pulse motor 36 in accordance with the control signal from the CPU 103, so that the first slider unit 31 and the second slider unit 32 can be moved as intended.

As can be seen from FIG. 5, the scanner drive circuit 200 consists of a distribution circuit 201 for determining excitation order for each phase of the pulse motor 36 and outputting excitation signals to an excitation circuit in accordance with the control signal from the CPU 103, and an excitation circuit 202 for exciting each phase of the pulse motor in accordance with an excitation signal from the distribution circuit 201.

The pulse motor 36 has two phases, and its stator coil is made up of phase A, phase B, phase C, and phase D.

A velocity designating signal outputted from the CPU 103 takes the form of a pulse signal to give instructions for rotational operations of the pulse motor 36. The number of pulse signals generated in one second, which is to say the frequency of pulse signals, is called a pulse rate, and expressed in the unit pps (pulses per second). The higher the velocity, the larger the value of such pulse rate. A rotational direction designating signal is a signal of "H" or "L" level. For instance, if the signal is at "L" level, the rotational direction is clockwise (CW). If the signal is at "H" level, the rotational direction is counterclockwise (CCW).

Figure 6A:
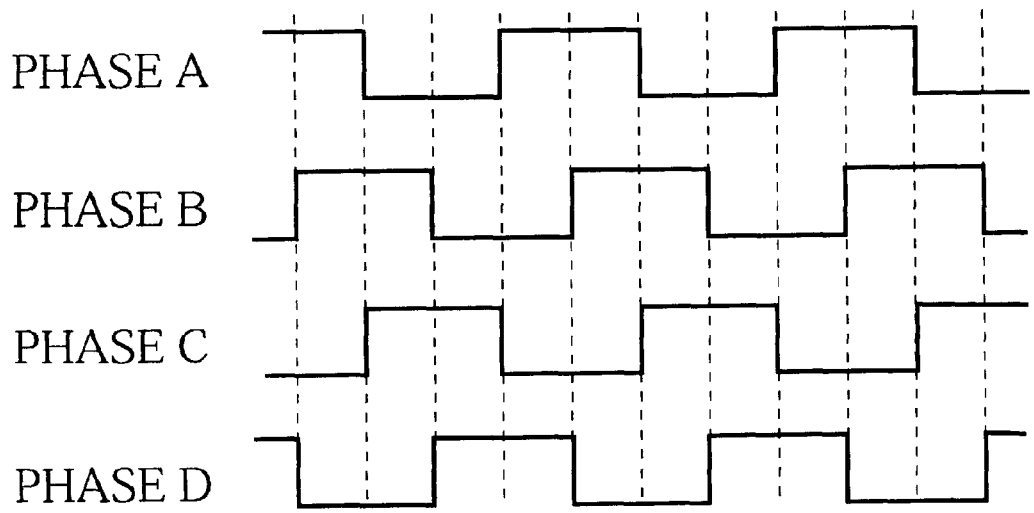
FIG. 6A shows the variation of excitation signals in each phase in the two-phase excitation system.
Figure 6B:
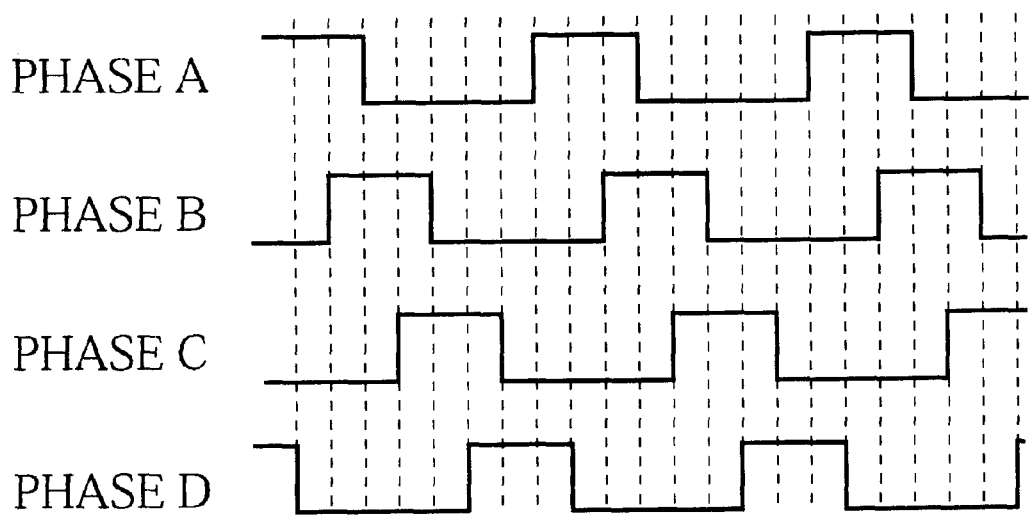
FIG. 6B shows the variation of excitation signals in each phase in the 1–2 phase excitation system.

The distribution circuit 201 generates an excitation signal as shown in FIG. 6 to rotate the pulse motor 36 in a predetermined direction. The distribution circuit 201 then outputs the excitation signal to the excitation circuit 202. FIG. 6A shows the excitation pattern in a two-phase excitation system, while FIG. 6B shows the excitation pattern in a 1–2 phase excitation system.

Thus, the distribution circuit 201 generates a basic excitation signal for either of the two-phase excitation system or the 1–2 phase excitation system. The larger the value of the pulse rate of the velocity designating pulse signal (which is to say, the higher the rotational velocity), the shorter the period for generating the basic excitation signal.

In this embodiment, when moving the optical system in the document scanning direction, the pulse motor 36 is driven by 1–2 phase excitation, and when returning the optical system to the scanning start position, the pulse motor 36 is driven by two-phase excitation. During scanning, a pitch of scanning lines is set at a minute distance to improve the analysis of the original image, while when the optical system is being returned, the pulse motor is driven at high velocity by two-phase excitation that allows higher torque than 1–2 phase excitation. By doing so, the time required for returning the optical system can be shortened.

The excitation circuit 202 drives the pulse motor 36 in accordance with an excitation signal.

Figure 7:
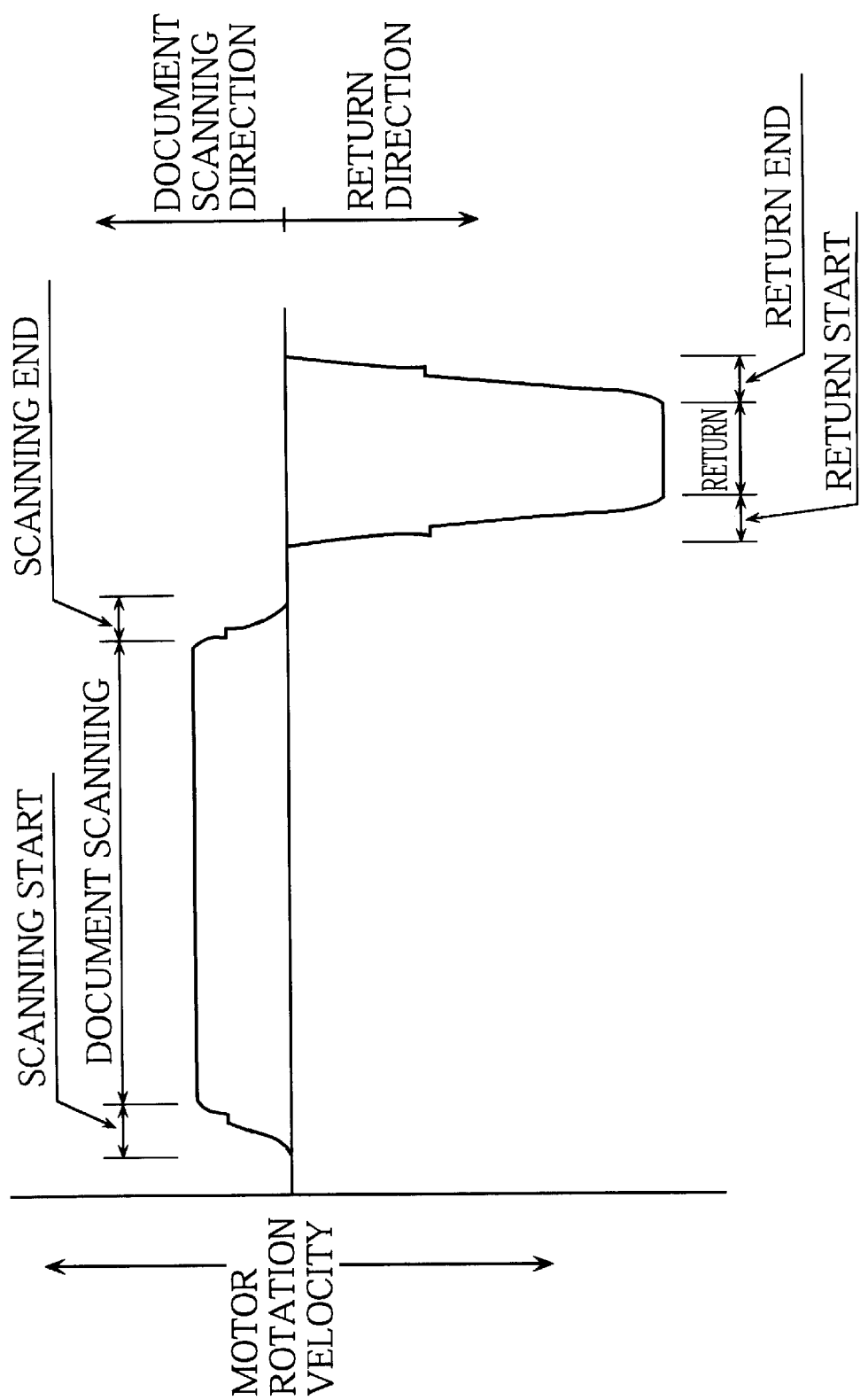
FIG. 7 shows an example rotational operation of the pulse motor from the scanning start to the return end.

The following is an explanation of the rotational operation of the pulse motor under the control of the scanner drive circuit 200, with reference to the timing chart of FIG. 7.

In this figure, the horizontal axis indicates time, while the vertical axis indicates the rotational direction and the rotational velocity of the pulse motor 36. As can be seen from this timing chart, the rotational motion of the pulse motor 36 is controlled so that (a) the first slider unit 31 accelerates from the halt state to the document scanning velocity (scanning start), (b) the scanning velocity is maintained for a predetermined period of time (document scanning), (c) the first slider unit 31 decelerates after the scanning and then comes to a halt (scanning end), (d) the first slider unit 31 is returned at high velocity (return), and (e) as the first slider unit 31 approaches the document reading start position, it decelerates and finally comes to a halt (return end). As shown in FIG. 7, the overall rotational velocity is controlled during acceleration and deceleration to draw a gradual S-line (this control operation will be hereinafter referred to as "S-line control").

The pattern program of such an operation control is stored in the ROM 113 (shown in FIG. 4). The CPU 103 reads out this program from the CPU 104 upon receipt of a scanning request to perform the control operation.

Figure 8:
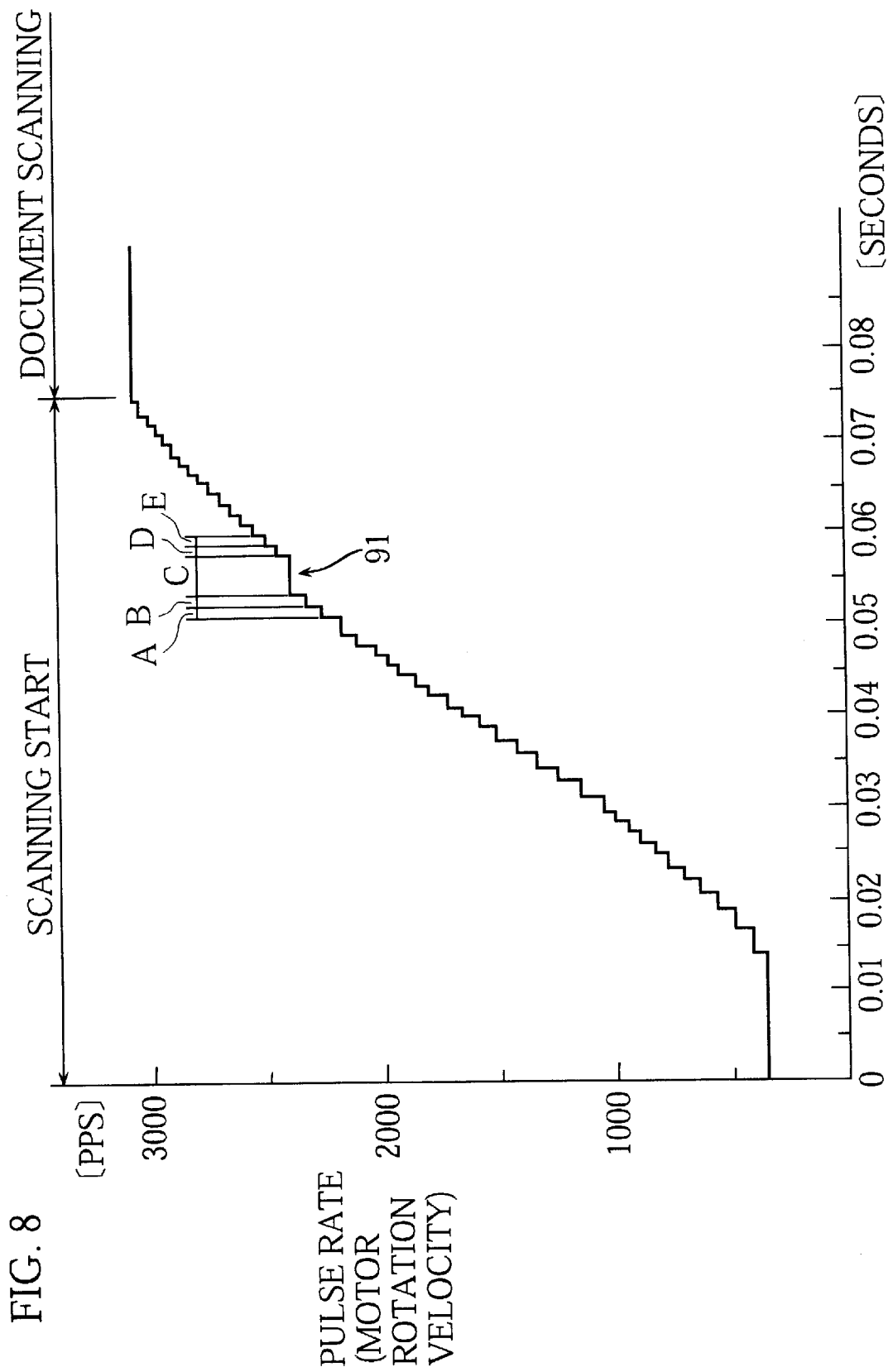
FIG. 8 shows an example rotational operation of the pulse motor when scanning is commenced.

The following is a detailed description of the rotational operation control of the pulse motor 36 at the start of scanning, with reference to FIG. 8.

In FIG. 8, the horizontal axis indicates time, while the vertical axis indicates the pulse rate (i.e., the rotational velocity). As can be seen from this timing chart, the rotational velocity of the pulse motor 36 is kept at each pulse rate for a predetermined period of time and gradually increased until it reaches the rotational velocity which corresponds to the scanning velocity. During this scanning start period, the first slider unit 31 accelerates from a halt state to the document scanning velocity. In this embodiment, it reaches the scanning velocity in approximately 0.075 seconds.

In the prior art, tension tends to accumulate inside the materials that constitute the power transmission mechanism between the pulse motor and the first slider unit 31. This happens especially in the wires. After the optical system has reached the document scanning velocity and started moving at a constant velocity, the tension is released in one burst, causing the optical system to overshoot and in turn resulting in fluctuation in the velocity of the optical system.

In this embodiment, however, a constant velocity region 91, which is an interval for holding a specified pulse rate and is longer than other pulse rate holding intervals, is provided during the acceleration period. By easing the acceleration during this interval, the tension which has been accumulated on the wires can be substantially eliminated, and the overshoot caused when reaching the document scanning velocity can be reduced. Since the deceleration region of the prior art is replaced with the constant velocity region in this embodiment, the load on the pulse motor is small, and overshoot can be prevented without using a large motor.

In this embodiment, the interval C corresponds to the constant velocity region 91. Table 1 of FIG. 12 shows the pulse rate (pps), the number of pulses (N), and the interval time (N/pps) in the interval C as well as in intervals A, B, D, and E which come before and after the interval C.

The number of pulses is the number of pulse signals generated in an interval, and an interval time is a period of time required for generating the number of pulses. As shown in Table 1, a period of time corresponding to 10 pulses is allocated to the interval C. Accordingly, the interval C is longer than the intervals allocated with only three-pulse time before and after the interval C.

Since an acceleration easement interval is employed to disperse the tension caused on the wires, the position to employ the acceleration easement interval can in theory be anywhere under the S-line control. However, fluctuations in velocity can be more effectively reduced by setting the acceleration easement interval as described below.

When accelerating under the S-line control, the acceleration rate is not constant and changes greatly when switching from a lower acceleration to a higher acceleration. At this point, great tension is built up in the wires, which results in a small elongation and then contraction of the wires. This is described in more detail below.

Figure 9A:
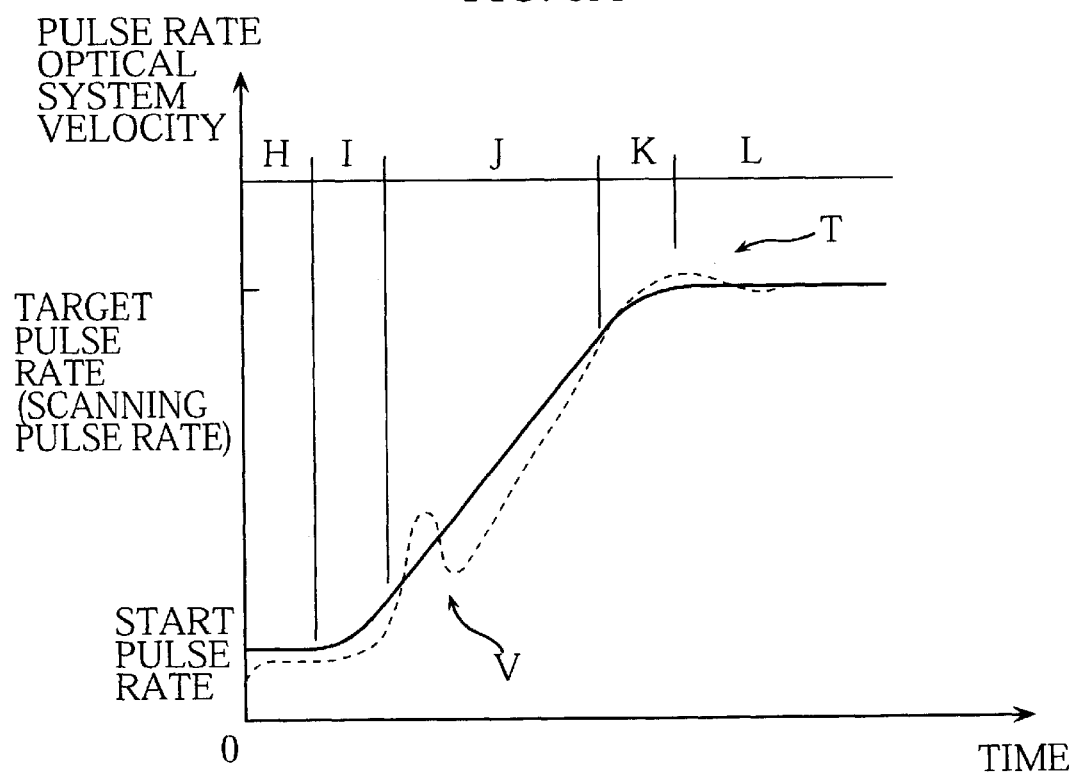
FIG. 9A shows the relationship between the velocity of the pulse motor and the velocity of the optical system in which the velocity of the pulse motor at the early stage traces an S-shaped curve.

FIG. 9A shows the conventional S-line control. In this figure, the horizontal axis indicates time, while the vertical axis indicates the pulse rate (i.e., the rotational velocity) and the velocity of the optical system. The solid line in the figure represents variation of the pulse rate, shown for convenience in the form of a curve. Actually, the variation of the pulse is as shown in FIG. 8. As can be seen from the solid line in FIG. 9A, the acceleration is low during the initial period in interval H, which is a period for holding the start pulse rate for a predetermined period of time. Interval J is a period for accelerating linearly to reach the scanning pulse rate in a target period of time. Interval I is a period for increasing the acceleration between the interval H and the interval J. Interval K is a period for reducing the rate of change in the pulse rate compared with the interval J before reaching the scanning pulse rate, so that the pulse rate gradually reaches the rate in the interval L (velocity constant period). By shaping a gentle S-line curve (S-line control) at the start and the end of this scanning starting period, overshoots caused at the end of the acceleration when the scanner starts moving at a constant velocity can be reduced to some extent. Meanwhile, as can be seen from the figure, the acceleration dramatically increases in the interval I when moving from the interval H to the interval J. Here, the optical system is unable to keep up with the velocity of the pulse motor because of its inertia. As a result, the wires in the power transmission mechanism become slightly elongated. Immediately after entering the interval J, the elongated wires try to contract to their original state, which gives a jolt to the optical system, making it move at a higher velocity than the pulse motor driving velocity. When the optical system has reached the highest velocity and the wires have stopped contracting, the optical system resumes moving by means of the driving force of the pulse motor. As a result, the moving velocity of the optical system will fluctuate as shown by arrow V in FIG. 9A. This fluctuation continues during scanning and adversely affects the scanning accuracy.

Figure 9B:
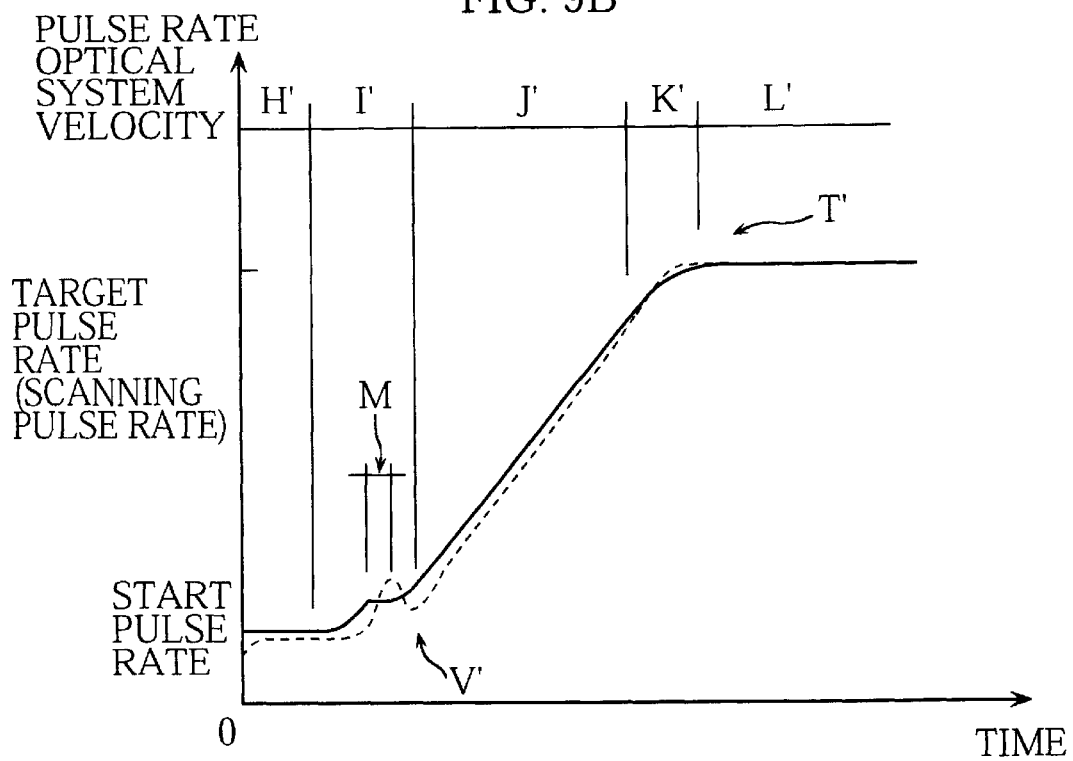
FIG. 9B shows the relationship between the velocity of the pulse motor and the velocity of the optical system in the case where an acceleration easement interval is provided when the pulse motor reaches the start of the S-shaped curve.

As shown in FIG. 9B, the fluctuations in velocity described above can be reduced by providing the acceleration easement period M at an appropriate timing during the interval I where there is a large change in the acceleration of the optical system, so that the tension which builds up in the wires as the acceleration rapidly increases can be temporarily eliminated. Here, since the wires are not particularly elongated at the start of the interval I, but are fully elongated by the end of the interval I, it is preferable for the acceleration easement period M to be provided in the middle of the interval I. The precise timing for the provision of the acceleration easement period M can be found by experimentation, and will differ depending on the rate of increase in acceleration during the interval I, on the elasticity of the wires and other parts, and on the mass of the scanner and other parts.

The above explanation describes the provision of an acceleration easement period 91 during a positive acceleration period to prevent of overshoot which occurs when the optical system reaches the document scanning velocity. However, a similar phenomenon ("undershhot") can occur during a deceleration period, so that in the present embodiment, four acceleration easement periods (91, 92, 93, and 94) are respectively provided during the start of scanning, the end of scanning, the start of the return, and the end of the return shown in FIG. 7, so that fluctuations in the velocity of the optical system can be thoroughly removed. An example of the rotational operation control of the pulse motor 36 during the deceleration ("minus acceleration") period at the end of scanning is shown in FIG. 10. In the same way as FIG. 8, the horizontal axis of FIG. 10 represents time, while the vertical axis represents pulse rate. As shown in FIG. 10, the pulse rate is reduced to zero around 0.033 seconds after the start of the scanning end period. The constant velocity period (acceleration easement period) 92 is provided to prevent the occurrence of undershoot at the end of the scanning end period. In the present example, the period C' is the constant velocity period 92, with Table 2 of FIG. 13 showing the pulse rate (pps), the number of pulses (N), and the interval time (N/pps) in the interval C' as well as in intervals A', B', D', and E' which come before and after the interval C'.

As shown in Table 2, the interval C is a time period equivalent to 5 pulses, and so is longer than the preceding intervals which are time periods (N/pps) equivalent to 3 pulses, and the following intervals which are time periods equivalent to 2 pulses (N/pps).

It should be noted that while the present embodiment describes the easement of acceleration using a constant velocity period, this need not be the case for the present invention, so that a period with lower (absolute) acceleration than the preceding and succeeding periods may be provided to ease the acceleration.

Figure 11:
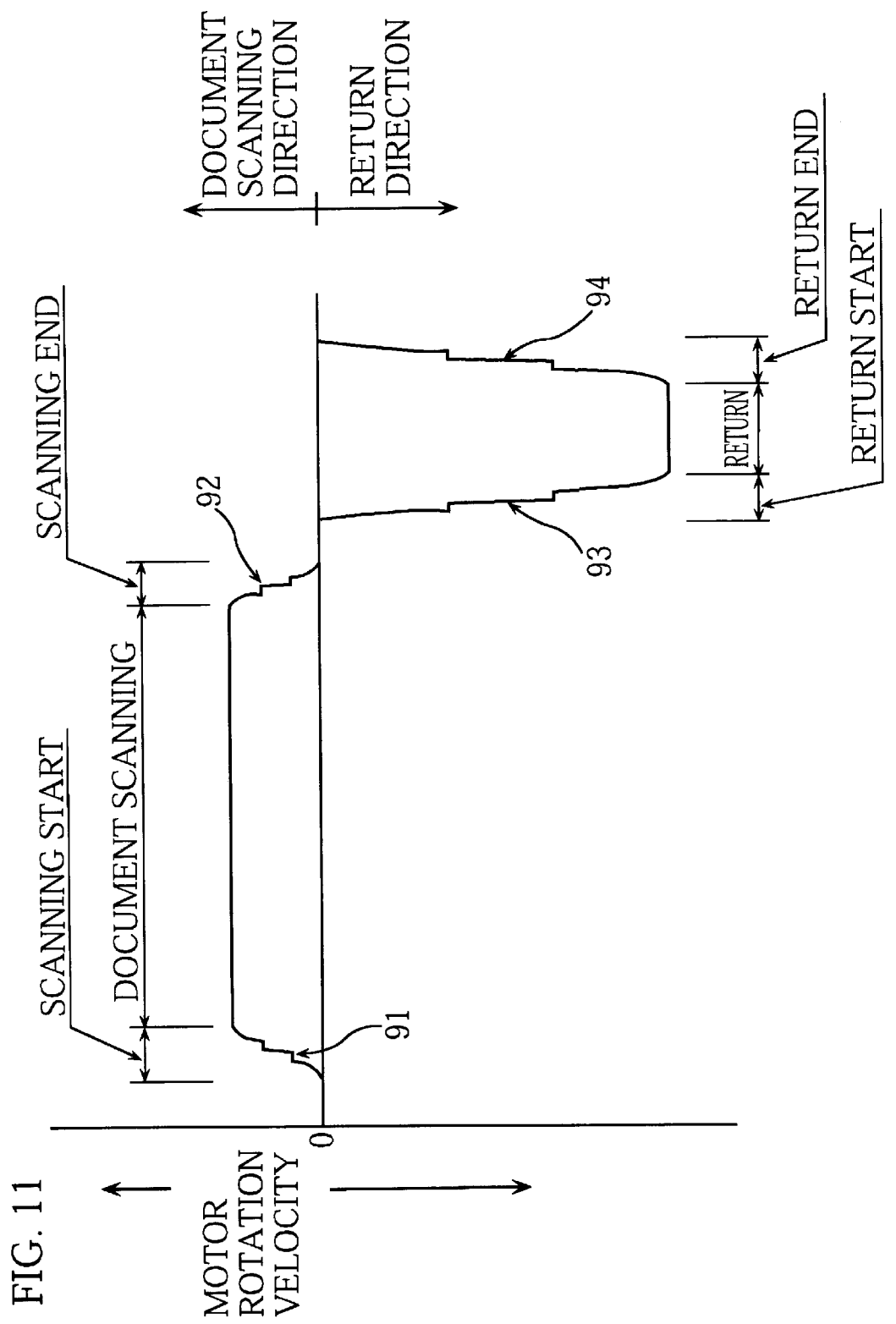
FIG. 11 shows an example rotational operation of the pulse motor from the scanning start to the return end.

The present embodiment also describes the case where only one acceleration easement period is provided in each acceleration or deceleration period, although, as shown in FIG. 11, two acceleration easement periods may be provided in each of the four acceleration periods. Here, the number of acceleration easement periods provided in each acceleration period is equal, although this does not need to be the case, so that different numbers of acceleration easement periods may be used in different acceleration periods.

Finally, the present embodiment describes the execution of S-shaped control with an acceleration easement period being provided in between, although the present invention may instead perform constant acceleration control in the same way as the prior art, with an acceleration easement period being further provided in between to prevent the occurrence of overshoots.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An optical system driving device comprising:
a driving unit for driving an optical system; and
a controller for controlling the driving unit so as to create an easement period, during a period in which the acceleration of the optical system is increasing, for temporarily easing acceleration during an acceleration period in which the optical system accelerates to reach a predetermined running velocity, wherein
the controller controls the driving velocity of the driving unit to become a constant velocity during the easement period.

2. An optical system driving device comprises:
a driving unit for driving an optical system; and
a controller for controlling the driving unit so as to create an easement period, during a period in which the acceleration of the optical system is increasing, for temporarily easing acceleration during an acceleration period in which the optical system accelerates to reach a predetermined running velocity, wherein
the driving unit comprises:
a pulse motor, and
a transmission mechanism for converting rotational motion of the motor into running motion, and then transmitting the running motion to the optical system;
the controller controls rotational velocity of the motor, which is the driving velocity; and the controller comprises:
a pulse rate setting unit for setting a pulse rate, and for creating the easement period during the acceleration period by holding the pulse rate at a predetermined pulse rate for a time period which is longer than a time period for preceding and succeeding pulse rates, and
a driving pulse generating unit for generating a driving pulse of the pulse motor in accordance with the pulse rate set by the pulse rate setting unit.

3. An optical system driving device comprising:
a driving unit for driving an optical system; and
a controller for controlling the driving unit so as to create an easement interval during a period in which the acceleration is increasing for temporarily easing acceleration during an acceleration period in which the optical system accelerates to reach a predetermined running velocity,
wherein the controller controls the driving velocity of the driving unit to become a constant velocity during the easement interval.

4. An optical system driving device according to claim 3, wherein
the controller controls the driving unit so that during acceleration, the optical system resumes accelerating at the same acceleration rate as before the driving velocity of the driving unit is controlled.

5. An optical system driving device according to claim 3, wherein
the driving unit comprises:
a motor; and
a transmission mechanism for converting rotational motion of the motor into running motion, and then transmitting the running motion to the optical system, and the controller controls rotational velocity of the motor, which is the driving velocity.

6. An optical system driving device according to claim 5, wherein
the motor is a pulse motor, and
the controller comprises:
a pulse rate setting unit for setting a pulse rate, and for creating the easement period during the acceleration period by holding the pulse rate at a predetermined pulse rate for a time period which is longer than a time period for preceding and succeeding pulse rates; and
a driving pulse generating unit for generating a driving pulse of the pulse motor in accordance with the pulse rate set by the pulse rate setting unit.

7. An optical system driving device comprises:
a driving unit for driving an optical system; and
a controller for controlling the driving unit so as to create an easement period, during a period in which the acceleration of the optical system is increasing, for temporarily easing acceleration during an acceleration period in which the optical system accelerates to reach a predetermined running velocity, wherein
a second easement interval is additionally provided in the acceleration period, with the easement period and the second easement interval being spaced apart in the acceleration period.

8. A driving device comprising:
a driving unit for driving a driven object; and
a controller for controlling the driving unit so as to create an easement period, during a period in which the acceleration of the driven object is increasing, for temporarily easing acceleration during an acceleration period in which the driven object is driven with an increasing acceleration, wherein
the controller controls the driving velocity of the driving unit to become a constant velocity during the easement period.

9. A drive device comprising:
a driving unit for driving a driven object; and
a controller for controlling the driving unit so as to create an easement period, during a period in which the acceleration of the driven object is increasing, for temporarily easing acceleration during an acceleration period in which the driven object is driven with an increasing acceleration, wherein
a second easement period is additionally provided in the acceleration period, with the easement period and the second easement period being spaced apart in the acceleration period.

10. An optical system driving device comprising:
a driving unit for driving an optical system; and
a controller for controlling the driving unit so as to create a plurality of acceleration easement periods during a period in which the acceleration is in a starting region comprising a series of acceleration rate intervals for temporarily easing acceleration during an acceleration period in which the optical system accelerates to reach a predetermined running velocity.

11. A method for operating a drive device, comprising the steps of:
(1) performing an acceleration operation to move a driven object in a predetermined direction by a motor;
(2) performing an interval easement operation within a period during which acceleration of the driven object is increasing to ease acceleration; and (3) terminating the easement operation to resume the acceleration operation, wherein a velocity of the driven object becomes constant during an easement period.

12. A method for operating a drive device, comprising the steps of:

(1) performing an acceleration operation to move a driven object in a predetermined direction by a motor;

(2) performing a plurality of easement operations within a period during which acceleration is in a starting region to ease acceleration; and (3) terminating the easement operation to resume the acceleration operation.

* * * * *

UNITED STATES PATENT AND TRADEMARK OFFICE
CERTIFICATE OF CORRECTION

PATENT NO. : 6,618,554 B1
DATED : September 9, 2003
INVENTOR(S) : Jinbo et al.

It is certified that error appears in the above-identified patent and that said Letters Patent is hereby corrected as shown below:

<u>Title page,</u>
Item [*], Notice, Please delete "0 days" and insert -- 680 days --.

Signed and Sealed this

Eighth Day of June, 2004

JON W. DUDAS
*Acting Director of the United States Patent and Trademark Office*